United States Patent
Chou et al.

(10) Patent No.: US 6,909,679 B2
(45) Date of Patent: Jun. 21, 2005

(54) METHOD AND A CONTROL CIRCUIT FOR CONTROLLING A BCA CLOCK TO READ A BCA DATA ON AN OPTICAL MEDIUM

(75) Inventors: Sue-Hong Chou, Taipei (TW); Yi-Lin Lai, Keelung (TW)

(73) Assignee: Via Technologies, Inc. (TW)

(*) Notice: Subject to any disclaimer, the term of this patent is extended or adjusted under 35 U.S.C. 154(b) by 546 days.

(21) Appl. No.: 10/007,727

(22) Filed: Nov. 9, 2001

(65) Prior Publication Data

US 2002/0057638 A1 May 16, 2002

(30) Foreign Application Priority Data

Nov. 10, 2000 (TW) .................................. 89123790 A

(51) Int. Cl.[7] ............................................. G11B 5/09
(52) U.S. Cl. ................................ 369/53.35; 369/47.14; 369/53.15
(58) Field of Search ..................... 369/53.35, 47.31, 369/47.14, 53.13, 53.31, 59.23, 59.25, 275.3, 53.28, 47.19, 53.15

(56) References Cited

U.S. PATENT DOCUMENTS

| | | | | |
|---|---|---|---|---|
| 5,878,020 A | * | 3/1999 | Takahashi | 369/59.25 |
| 6,295,262 B1 | * | 9/2001 | Kusumoto et al. | 369/53.37 |
| 6,414,920 B1 | * | 7/2002 | Lee | 369/47.31 |
| 6,519,213 B1 | * | 2/2003 | Song et al. | 369/44.26 |
| 6,552,979 B1 | * | 4/2003 | Mokry et al. | 369/47.38 |

* cited by examiner

*Primary Examiner*—Paul W. Huber

(57) ABSTRACT

A method for controlling the burst cutting area (BCA) clock in reading BCA data and a circuit of the same functions to allow BCA data to be read correctly. A BCA clock extractor is used for reading the BCA data correctly. A proper clock modulation is performed through this BCA clock extractor so as to read BCA data correctly.

5 Claims, 9 Drawing Sheets

METHOD AND A CONTROL CIRCUIT FOR CONTROLLING A BCA CLOCK TO READ A BCA DATA ON AN OPTICAL MEDIUM

1. FIELD OF THE INVENTION

The present invention relates to a method and a control circuit for controlling a BCA clock to read a BCA data on an optical medium, in that a BCA clock extractor is used for modulating the clock of the BCA data so that correct BCA data can be read.

2. BACKGROUND OF THE INVENTION

Nowadays, with the progress of photoelectric technology, the digital audio and video devices are more and more popular. In that, digital versatile disks (DVD) and video compact disks (VCD) are the necessary devices. In the current compact disk manufacturing technology, a burst cutting area (BCA) is on the central round hole of disk for recording the relative data of a compact disk and controlling the reading of a digital versatile disk.

Currently, the BCA clock for reading the BCA data in a digital versatile disk is used as reference clock for controlling the system chipset to read BCA data correctly. With reference to FIG. 1, which shows a timing of the BCA clock for reading the BCA data in the prior art. It can be appreciated from FIG. 1 that the data type of the BCA is defined as a combination of bit "1" and bit "0" with a period of T. The data reading must be performed according to the BCA clock. In FIG. 1, as the BCA data is one "0" in T1, then a pulse is generated in the corresponding BCA clock. When N is 1 (one "0"), then a pulse is generated with respect to the data type. Then, in T2, while as N is 2 (three "0" bits), three pulse signals are generated with respect to the BCA clock signal. Then, in T3, while as N is 3 (five "0" bits), five pulse signals are generated with respect to the BCA clock signal. When the system reads data, the above correct clock pulses are necessary. Those aforesaid are references of the BCA clocks generated by a system chipset in the data reading of the prior art. Those skilled in the art should understand that not all the prior art uses the same way to generate BCA clock.

However, in the current method for reading BCA data, it is possible that an error reading is generated due to defects of the compact disk. Referring to FIG. 2, it is illustrated that an abnormal signal occurs in the BCA data as a fault is generated in a working system, i.e., defects are generated in this compact disk so that pulses in the BCA clock are also incorrect. The example in FIG. 2 is referred to that of FIG. 1, in the periods of T2' and T3', data is incorrect read out due to faults in the pulses of the BCA so that the BCA data is also incorrect. In the periods of T2' and T3' having incorrect data reading, the BCA clock has a reference clock with a fixed period generated by the working system. After the succeeding BCA clock is correct, the pulses in this period will restore to a correct way for generating a reference clock to be used in the succeeding reading of the BCA data. However, due to the previous defect in the compact disk, although the generation of the BCA clock has restored to a normal condition, the reference pulse oscillation required in the succeeding reading of the BCA data is not matched to the original data number, the fault in the data reading still occurs.

In the aforesaid prior art, as defects occur so that the reading operation is abnormal, a fixed reference clock preset in the system will be generated in the BCA clock. This preset reference clock is not matched to the actual reference clock in the data reading. Therefore, when the BCA signal is restored to a normal condition, the oscillating signal from the reference clock generated by the BCA clock will generate faults in the data reading. In order that the generated BCA clock can cause the reading work to be performed effectively, after the BCA data restores to a normal condition, a preferred clock control method is necessary.

SUMMARY OF THE INVENTION

Accordingly, the primary object of the present invention is to provide a method for controlling the BCA clock and a circuit of the same. Thereby, the data on the BCA can be read effectively and correctly.

Another object of the present invention is to provide a method for controlling the BCA clock and a circuit of the same, wherein when the data read from the BCA has fault, then a correct and rapid process can be performed so that the data reading in the BCA can be performed correctly.

A further object of the present invention is to provide a method for controlling the BCA clock and a circuit of the same, wherein by a BCA clock extractor, a correct clock modulation can be performed for recovering defect data.

In order to achieve the aforesaid object, by the present invention, the data reading of a BCA can be performed correctly.

According to the invention, the method for controlling a BCA clock to read a BCA data on an optical medium includes: as a defect occurs, then modulating the BCA clock for reading the BCA data in the defect;) checking the BCA data; and if the BCA data is matched, outputting the BCA data; else re-modulating the BCA clock.

According to another object of the invention, a clock control circuit for controlling a BCA clock to read a BCA on an optical medium is provided. The control circuit includes: a counting unit for receiving a BCA data and a BCA reference clock and outputting a counting signal based on the BCA reference clock, the counting signal being cleared according to the data of the BCA; a comparator for receiving the counting signal from the counting unit for being compared with a default value, if equal, then a corresponding signal being outputted; a switching unit for receiving an output from the comparator, the BCA data, a defect signal and a BCA reference clock for switching an outputted control signal; and an output unit for receiving an output of the comparator and the control signal from the switching unit for outputting a BCA clock signal.

As a conclusion, when defect is happened in reading BCA, the frequency of BCA CLOCK is changed, and the changed frequency is used to re-read the defect. After going through whole BCA area, the BCAECC checks the data defect. If the defect can be recovered by BCAECC, it is known that the frequency-changed BCA CLOCK is suitable for the defect recovery. On the contrary, if the defect cannot be recovered via BCAECC, it means the frequency-changed BCA CLOCK cannot read the defect properly. Thus, disc is going to rotate a circle for re-read BCA data, and the frequency of the BCA CLCOK is continuously changed when re-reading till that the defect can be read properly. Or, in case of reading times over predetermined times, BCA data reading is abandoned.

The various objects and advantages of the present invention will be more readily understood from the following detailed description when read in conjunction with the appended drawing.

DETAILED DESCRIPTION OF THE PREFERRED EMBODIMENTS

In the present invention, a method for controlling a clock of a burst cutting area (BCA) and a circuit of the same are disclosed. By the components in the BCA clock extractor, the burst cutting area data in the optical disks or digital versatile disks are controlled and processed. In the general condition, an oscillation reference clock for reading data of normal mode is generated for executing data reading in the burst cutting area. Another, as problems occurs in a working system so that data in the burst cutting area can not be read correctly, the method for controlling a clock of a burst cutting area and a circuit of the same of the present invention can be used to process the burst cutting area oscillating clock. After the working system returns to a normal condition, the burst cutting area data can be read effectively.

Figure 1:
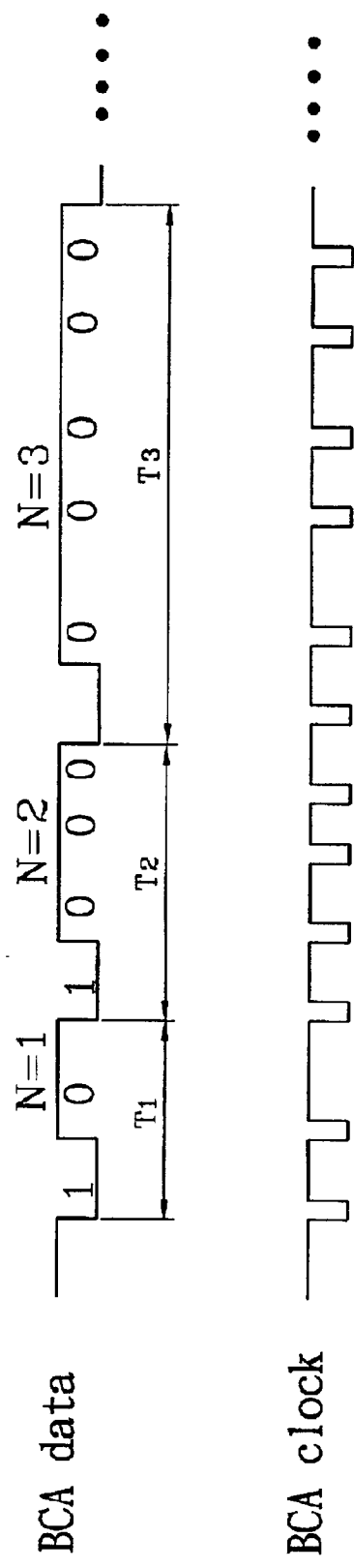
FIG. 1 is a schematic view of a BCA clock in the prior data reading.
Figure 2:
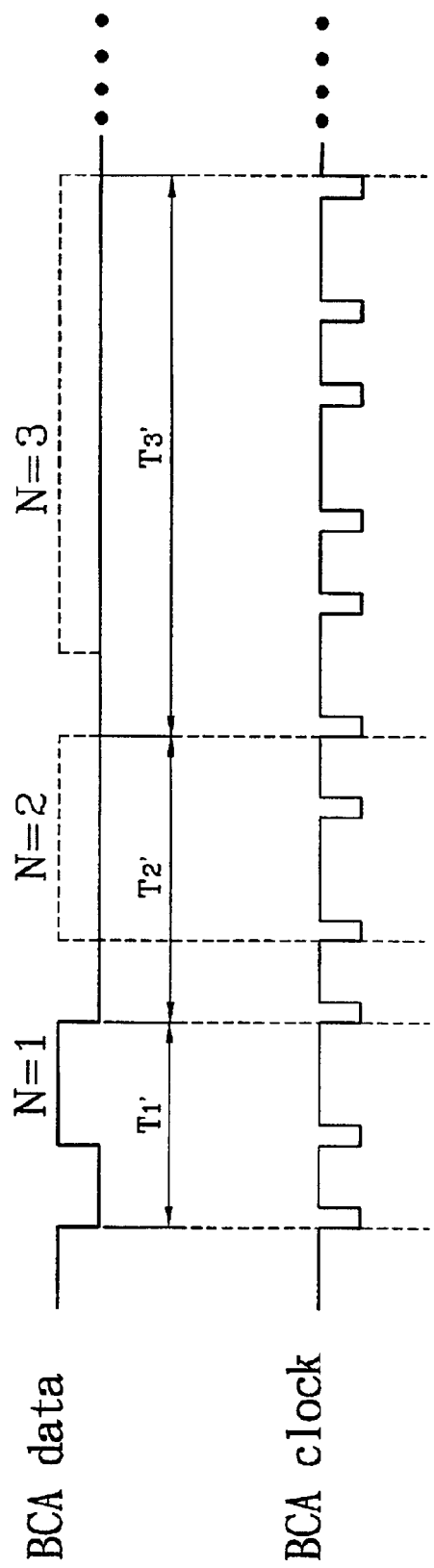
FIG. 2 is a schematic view of a BCA clock as a defect occurs in the BCA data in the prior art.
Figure 3:
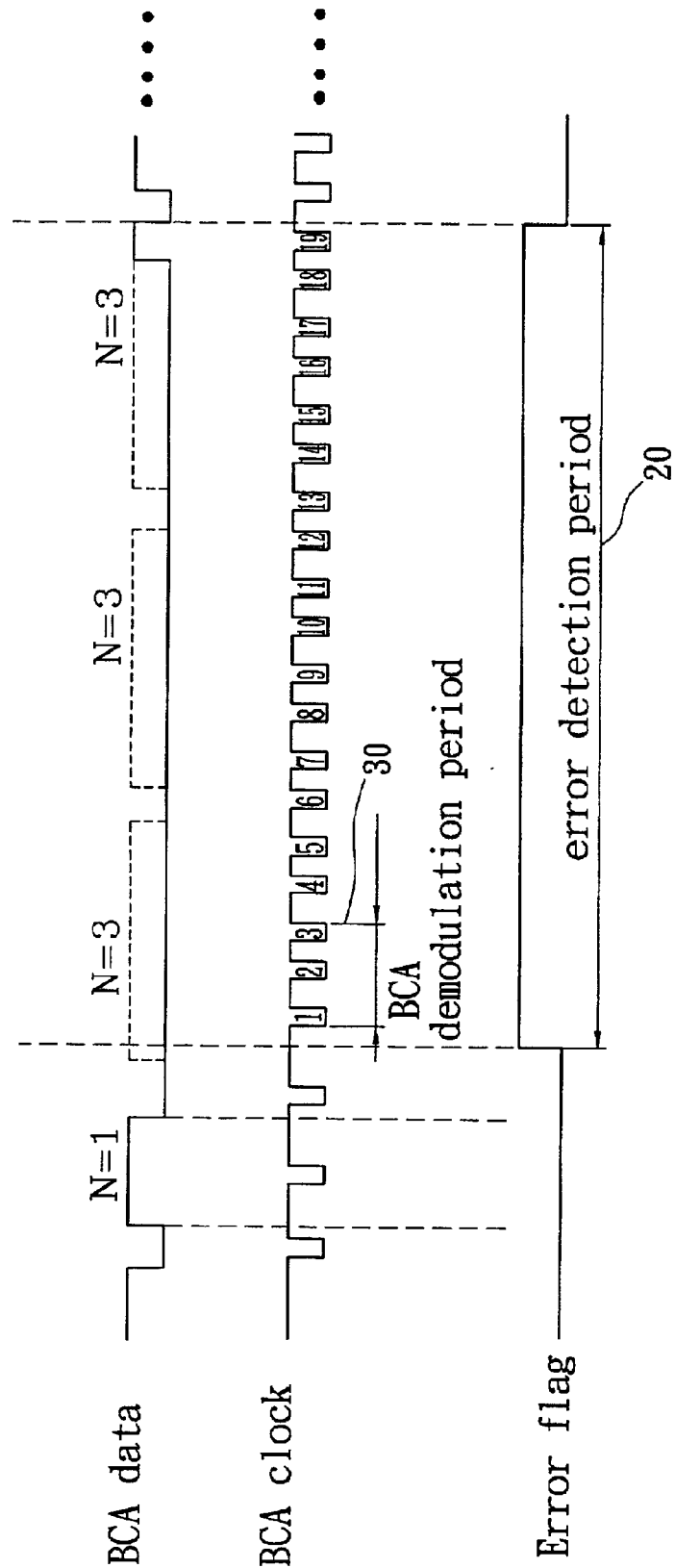
FIG. 3 is a schematic view showing the modulation of the BCA clock according to the present invention.

Referring to FIG. 3, in the method for controlling a clock of a burst cutting area and a circuit of the same of the present invention, when the data reading of the burst cutting area has some problems, a schematic view for modulation in the burst cutting area is shown. It is appreciated in the figure that when data in the burst cutting area has a fault, a normal processing can not be executed so that a plurality of dished line signals of zero bits is formed in the burst cutting area signals. The plurality of zero bits has a number according to the burst cutting area and the data has (2×N)+1 bits of 0s (N=1, 2, 3, etc.). After being processed to the burst cutting area clock according to the present invention, and after the data of the burst cutting area restores to a normal condition, it is processed by a normal mode, and normal works are restored.

In the conventional technological, if a defect occurs in the above burst cutting area data (BCA data), the BCA clock for reference has also problems. In the processing of the BCA clock according to the present invention, it is appreciated from FIG. 3 that the BCA clock generates a pulse of BCA modulation period 30 (BCAPRD). In the following BCA clock, a pulse oscillation occurs by the BCA modulation period 30. When an optic disk drive starts to read BCA data, the system starts to detect defects. As the system detects defects, the BCA clock extractor in the system actuates an error flag so as to enable in an error detection period 20 and simultaneously, a BCA clock with adjustable periods is generated for executing error correction. When no defect occurs, the BCA clock extractor immediately suspends the action of the error flag, and when the BCA data returns to a normal condition, the BCA clock executes a normal oscillation.

Figure 4:
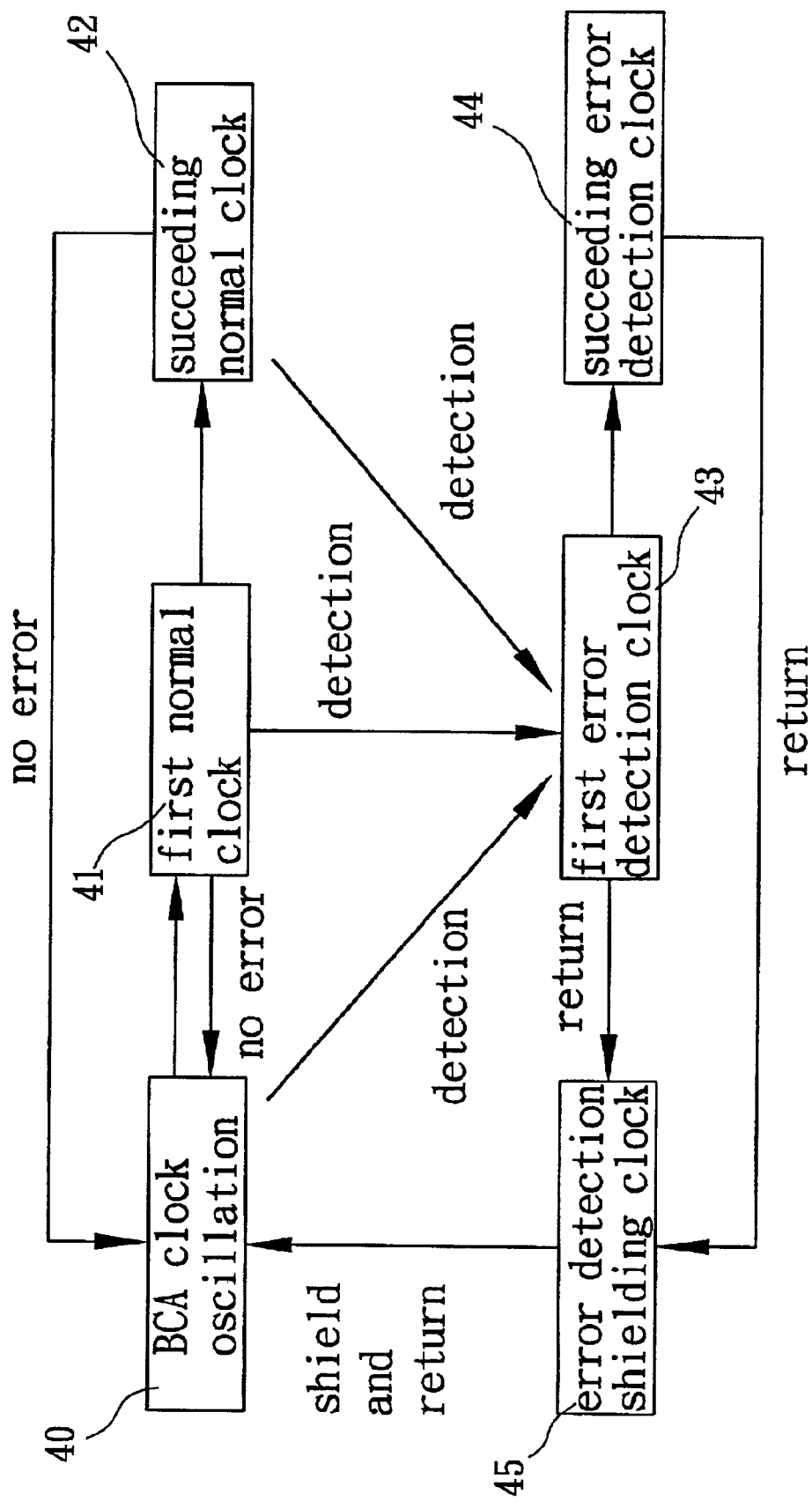
FIG. 4 is a schematic view showing the mode switch of the BCA clock according to the present invention.

Referring to FIG. 4, a schematic view of the BCA modulation processing in the method for controlling a clock of a burst cutting area and a circuit of the same according to the present invention is illustrated. It is appreciated from the figure that as a BCA clock oscillation 40 executes, if the BCA clock continuously outputs normally, a first normal clock 41 is outputted first and an error detection process is executed. If no defect occurs, the succeeding normal clock 42 is outputted continuously and an error detection process is executed. However, in output of BCA clock oscillation 40, for example, first normal clock 41 and succeeding normal clock 42, once the error detection is active, i.e., an error detected in reading the compact disk, the work is immediately switched to a condition of outputting the first error detection clock 43. In the error detection condition, the first error detection clock 43 continuously outputs succeeding error detection clock 44. When the first error detection clock 43 and the succeeding error detection clock 44 are output, the data of the compact disk has no defect, namely the extraction of data returns to a normal condition. Then the flow returns to the output of an error detection shielding clock 45 for executing a work of clock restoring and thus returning to operation of the BCA clock oscillation 40.

Figure 5:
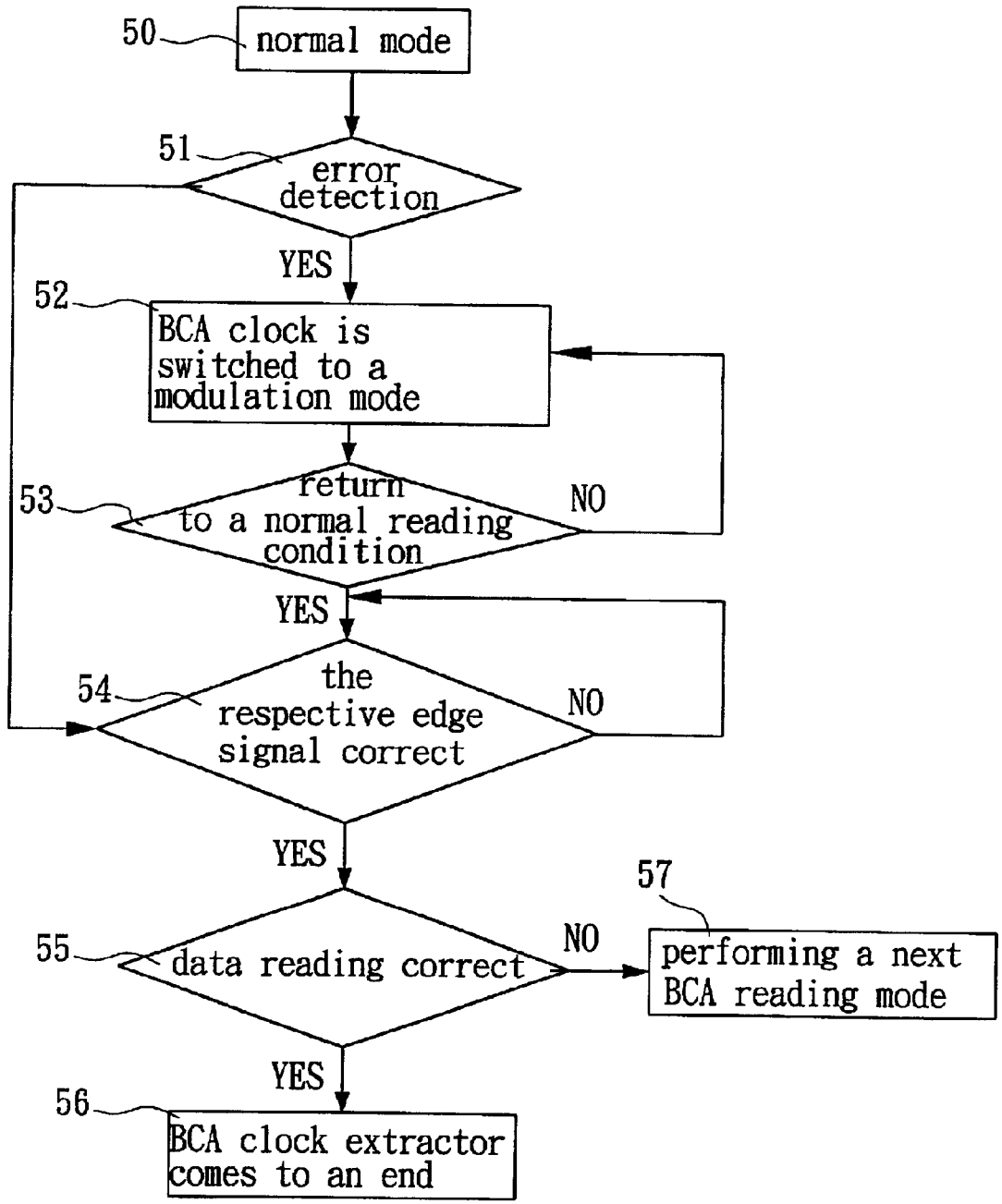
FIG. 5 shows the flow to the present invention.

With reference to FIG. 5, the process of BCA clock modulation of the present invention is illustrated. It is known from FIG. 5 that as the working system of the present invention performs, a normal mode (step 50) serves to process the output of the BCA reference clock and the error detection work is performed at any time. In the error detection (step 51), if no error occurs, it is determined whether the respective edge signal of the clock is correct (step 54). Once an error occurs, the BCA clock is switched to a modulation mode (step 52), the signal modulation is processed by clock signal detection, and it is determined whether the succeeding shielding clock is outputted continuously. In reading data from the compact disk, defect detecting is made by detecting whether the reading operation in the BCA is in a normal condition. Before being adjusted to a normal clock in case of no defect, and the data reading in the BCA is normal, the BCA clock modulates continuously. After the BCA clock returned to a normal condition, a clock edge is detected so that the succeeding clock may return to a normal reading condition (step 53).

In determining whether the respective edge signal is generated (step 54), if yes, then it is determined that the succeeding data reading is executed normally, and the following process is performed. If not, the reading process performs continuously until a corresponding edge signal is generated, i.e., the step 54 is repeated. After the edge clock signal is aligned correctly, it is determined whether the reading data is correct as shown in the step 55. After an amount of data on the compact disk is read, and the clock signal has faults, the adjusting mode for the BCA modulation period will be executed. A BCA error correction code (BCA ECC) will determine whether the amount of data between the synchronous signals (Sync) read by the compact disk are matched, and the step 57 is stated as following. If not, for example, in case of that the amount of data read by the optic disk drive from the compact disk is larger than the required data amount, it represents the periodic clock generated by the BCA clock extractor during defect occurrence is too fast. On the contrary, if the amount of data read by the optic disk drive from the compact disk is smaller than the required data amount, it represents the periodic clock generated by the BCA clock extractor during defect occurrence is too slow. A fixed periodic pulse can be generated under the controlling of a firmware for adjusting the BCA modulation period (BCAPRD). If defects still occur in the following cycle, the BCA clock extractor will generate a lower or faster BCA clock frequency. When data in the cycle is read, then it is determined whether data is correct for being used as a reference of the periodic clock in the following cycle. The flow repeats, until a correct data is acquired. In determining whether the data is correct (step 55), after the data read from the BCA data is correct, the BCA working mode in the BCA clock extractor is terminated, as shown in step 56. In step 55, if the data is not correct, which means the BCA clock is not suitable for this defect, and then a next BCA reading mode is performed as shown in step 57. Performing a next reading mode means that the disk is rotated one cycle and the BCA data is read again.

Figure 6:
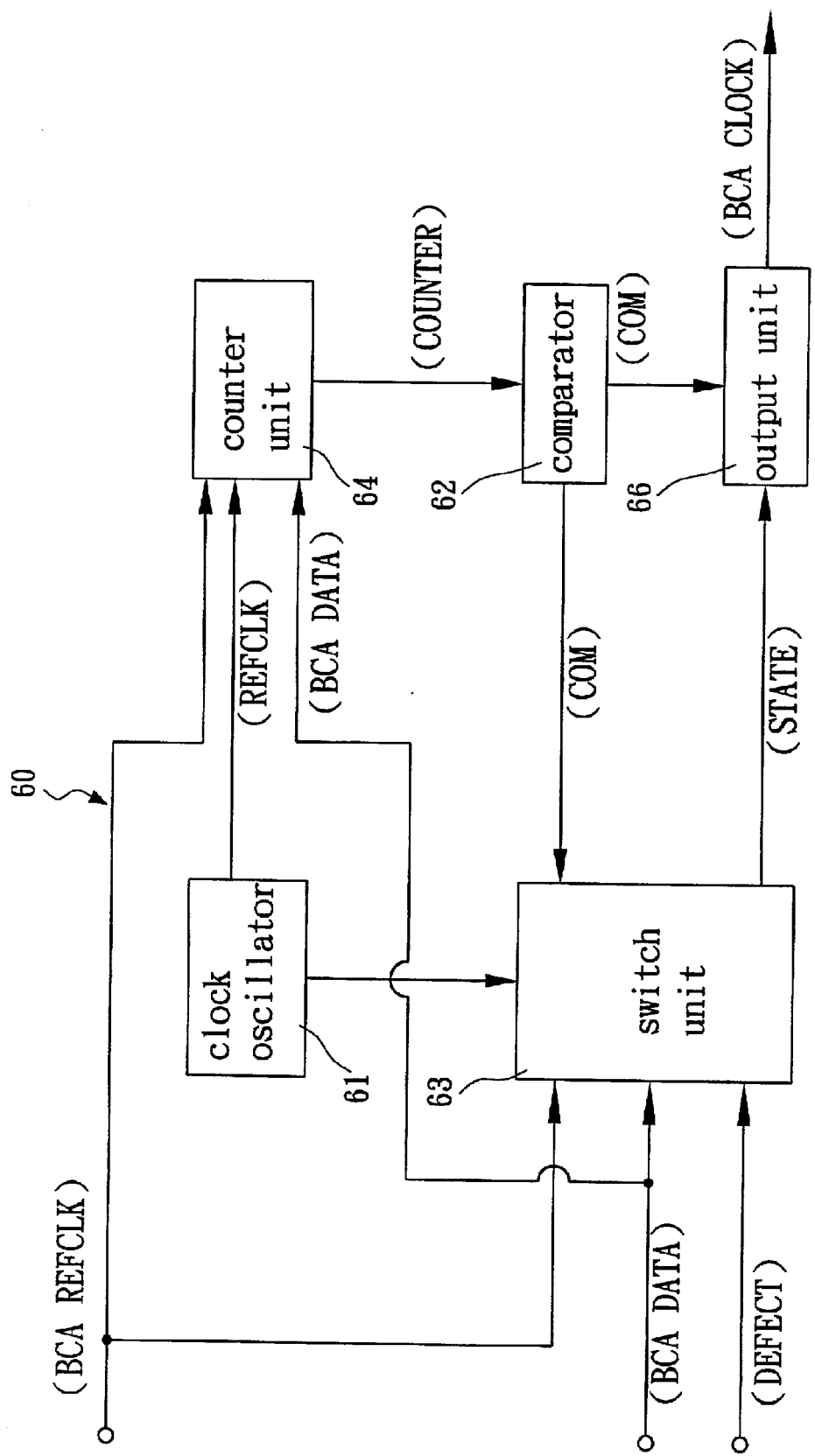
FIG. 6 is a schematic view showing the components of a BCA clock extractor according to the present invention.

Referring to FIG. 6, a block diagram of the BCA clock extractor 60 of the present invention is illustrated. With reference to FIG. 6, the input signal of the whole BCA clock extractor 60 includes a BCA reference clock (BCAREFCLK), a BCA data (BCA DATA), and a defect signals (DEFECT). The output signal is a BCA clock (BCA CLOCK). The BCA clock extractor 60 includes a clock oscillator 61 for generating a reference clock (REFCLK). The frequency of the reference clock (REFCLK) may be several times of the BCA reference clock (BCAREFCLK). The clock oscillator 61 is connected to a counting unit 64 and a switch unit 63 for providing reference clock signals required by the counting unit 64 and switch unit 63.

The switch unit 63 receives the BCA reference clock (BCAREFCLK), the BCA data (BCA CLOCK), the defect signals (DEFECT) and a comparator output signal (COM) outputted from a comparator 62, which receives a receiving reference clock (REFCLK). Afterward, the switch unit 63 switches the condition of the control signal (STATE) outputted to the output unit 66 to make the output unit 66 output a BCA clock (BCA CLOCK). The switching in the switch unit 63 is the switching way disclosed in FIG. 4, which performs the switching of the error detection clock.

Figure 7A:
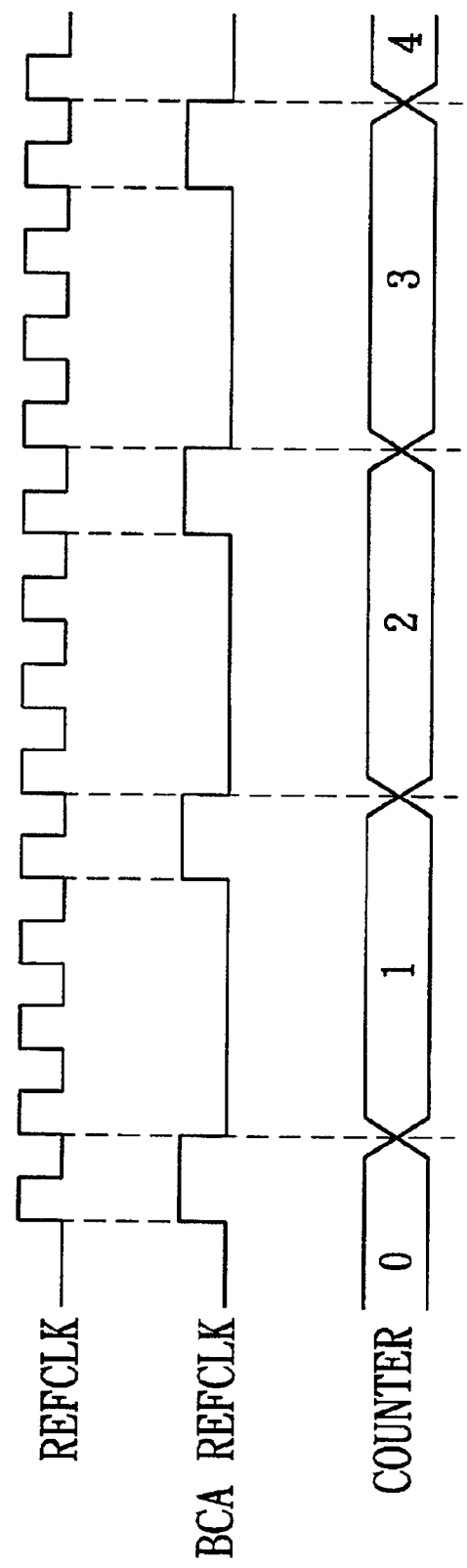
FIG. 7A is a timing diagram of the counting unit illustrated in FIG. 6.

The counting unit 64 in the FIG. 6 receives the BCA reference clock (BCAREFCLK), the reference clock (REFCLK), and BCA data (BCA CLOCK). The BCA reference clock (BCAREFCLK) is used as a base on counting. Then a counting signal (COUNTER) is outputted to the comparator 66. Further referring to FIG. 7A, a schematic view illustrating the timing diagram for the input signals of the counting unit is illustrated. It is appreciated that the counting signal (COUNTER) is based on the BCA reference clock (BCAREFCLK). Besides, the counting signal (COUNTER) is cleared according to the status change of the BCA data (BCA DATA). In the other aspect, the comparator 62 shown in FIG. 6 is to compare the value of the counting signal of the counting unit 64 with the default (Z1, MIN, Z0 MIN) in the comparator 62. If equal, a corresponding signal is outputted.

Figure 7B:
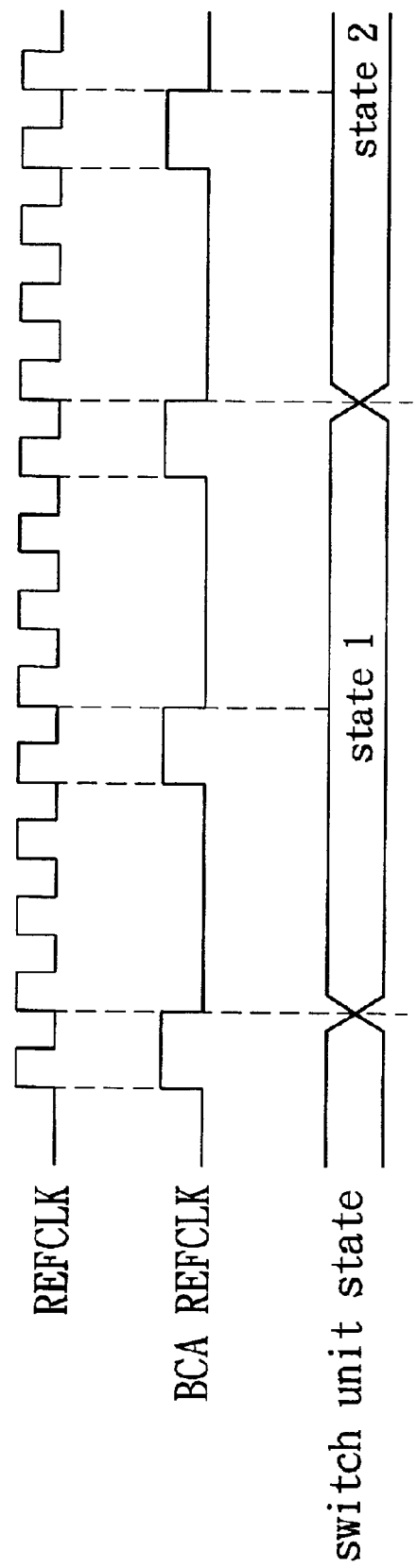
FIG. 7B is a timing diagram of the switching unit illustrated in FIG. 6.

When the status of the BCA data (BCA DATA) is changed (from 1 to 0, or from 0 to 1), the counting unit 64 will be reset. When the BCA data (BCA DATA) is 0, the switch unit 63 informs the comparator 62 to compare the value of Z1 MIN (for example 4) with the counting signal (COUNTER) of the counting unit 64. If the counting signal is 4, the comparator 62 will output a pulse to the output unit 66. Similarly, when the BCA data (BCA DATA) is 1, the switch unit 63 informs the comparator 62 to compare the value of 01 MIN (for example 40) with the counting signal (COUNTER) of the counting unit 64. If the counting signal (COUNTER) is 40, the output unit 66 will output a BCA clock signal (BCA CLOCK) according to the output signal (COM) of the comparator 62 and the control signal (STATE) of the switch unit 63. Besides, the comparing result of the comparator 62 also affects the switching state of the switch unit 63. The switching state of the switch unit 63 may refer to FIG. 7B. FIG. 7B is a timing diagram of the switch unit illustrated in FIG. 6. In FIG. 7B, it is illustrated that the switch unit 63 and the counting signal (COUNTER) both refer to BCA reference clock (BCAREFCLK) and reference clock (REFCLK). While the counting signal (COUNTER) is only switched when the BCA reference clock (BCAREFCLK) is 1 (high level). It is appreciated from FIG. 7B that when the BCA reference clock (BCAREFCLK) is in a high level, the switch unit 63 is uncertainly to switch the condition, and it must further consider the BCA data (BCA DATA), the defect signals (DEFECT) and counting signal (COUNTER), etc.

Figure 7C:
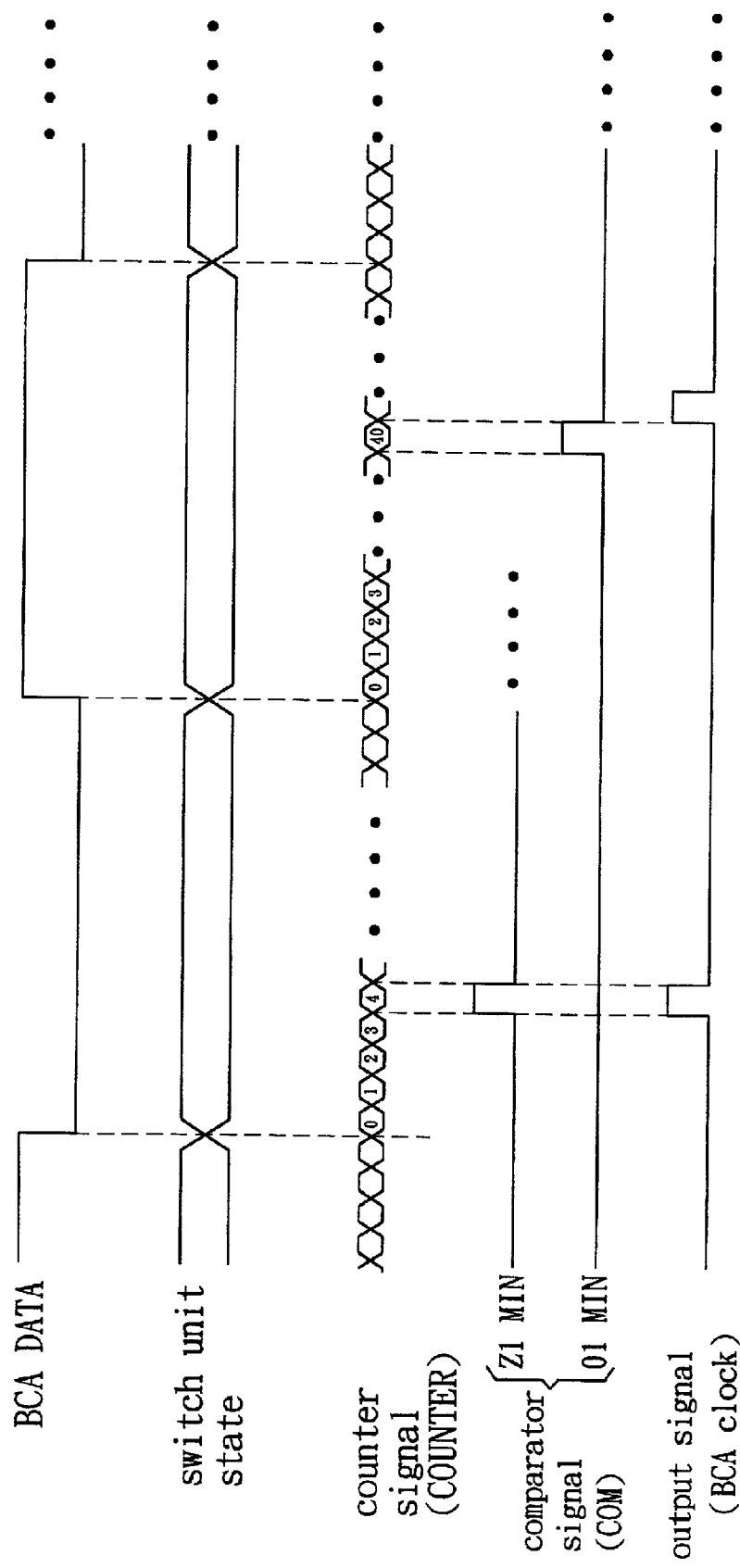
FIG. 7C is a timing diagram of the respective signal related to the output unit of FIG. 6.

The output unit 66 illustrated in FIG. 6 generates a BCA clock (BCACLOCK) according to the condition of the control signal (STATE) outputted from the switch unit 63 and the comparator output signal (COM) outputted from the comparator 62. In this aspect, referring to FIG. 7C, a timing diagram of the output unit illustrated in FIG. 6 is shown. In that, the aforesaid switch condition further considers the clock of the BCA data (BCA DATA). For example, the comparator signal includes a minimum value Z1 MIN (for example, 4) as one parameter. The minimum value of another parameter 01 MIN is 40. Afterwards, the output unit outputs a clock of the BCA clock extractor according to the result of signal comparing and a switch condition.

The connections of the units in the BCA clock extractor 60 and the timing diagram are described hereinabove. By the BCA clock extractor 60, the BCA clock is modulated. However, in a practical condition, in order that the reading of the BCA data can be more useful, other embodiments thereabout are disclosed in the present invention for achieving the same effects so that the data reading of the BCA can be completely matched to the clock control, and thus the data reading for a digital versatile disk (DVD) is accomplished.

In the method for controlling a clock of a burst cutting area and a circuit of the same according to the present invention, by the matching of the operation process of the BCA clock control and the control steps with the installing circuit, the data reading of the digital versatile disk is accomplished (in the past, it can not be completed) so that the user may read data successfully in the BCA for operation. Once a defect occurs, while a normal data processing is interrupted, by the method of the BCA clock control of the present invention and the circuit, a reference clock oscillation is generated. Therefore, when an abnormal signal occurs due to defect on a disk, data reading can be performed successfully.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for controlling a burst cutting area (BCA) clock to read a BCA data on an optical medium comprising:
   when a defect occurs, modulating the BCA clock for reading the BCA data in the defect;
   checking the BCA data; and
   if the BCA data is matched, outputting the BCA data else re-modulating the BCA clock.

2. The method for controlling a BCA clock to read a BCA data on an optical medium as claimed in claim 1, wherein the step of modulating the BCA clock comprises the step of changing frequency of the BCA clock.

3. The method for controlling a BCA clock to read a BCA data on an optical medium as claimed in claim 1, wherein the step of checking the BCA data is preformed by ECC (error correction code).

4. A clock control circuit for controlling a burst cutting area (BCA) clock to read a BCA data on an optical medium, comprising:

a counting unit for receiving BCA data and a BCA reference clock and outputting a counting signal based on the BCA reference clock, the counting signal being cleared according to the data of the BCA;

a comparator for receiving the counting signal from the counting unit for being compared with a default value, if equal, then a corresponding signal being outputted;

a switching unit for receiving an output from the comparator the BCA data, a defect signal and a BCA reference clock for switching an outputted control signal; and an output unit for receiving an output of the comparator and the control signal from the switching unit for outputting a BCA clock signal.

5. The circuit in claim 4, further comprising a clock oscillator for generating a reference clock and then sending the reference clock to the counting unit and the switching unit.

* * * * *